United States Patent [19]
Nishimoto

[11] Patent Number: 4,983,006
[45] Date of Patent: Jan. 8, 1991

[54] POLARIZATION-INDEPENDENT OPTICAL WAVEGUIDE SWITCH

[75] Inventor: Hiroshi Nishimoto, Tokyo, Japan

[73] Assignee: NEC Corporation, Tokyo, Japan

[21] Appl. No.: 330,024

[22] Filed: Mar. 29, 1989

[30] Foreign Application Priority Data

Mar. 29, 1988 [JP] Japan ............ 63-77898

[51] Int. Cl.$^5$ ............ G02B 6/10
[52] U.S. Cl. ............ 350/96.14; 350/96.13; 350/96.11
[58] Field of Search ............ 350/96.11, 96.12, 96.13, 350/96.14, 96.15, 96.17, 355, 356, 370, 374

[56] References Cited

U.S. PATENT DOCUMENTS

| | | | |
|---|---|---|---|
| 4,185,884 | 1/1980 | McMahon | 350/96.14 |
| 4,243,295 | 1/1981 | Alferness | 350/96.14 |
| 4,669,815 | 6/1987 | Thainiyavarn | 350/96.13 |
| 4,787,689 | 11/1988 | Korotky | 350/96.12 |
| 4,917,449 | 4/1990 | Granestrand | 350/96.14 |
| 4,936,644 | 6/1990 | Raskin et al. | 350/96.14 |
| 4,943,131 | 7/1990 | Taki | 350/96.12 |

FOREIGN PATENT DOCUMENTS 62-11831  1/1987  Japan ............ 350/96.14 X

OTHER PUBLICATIONS

Korotky et al., "Greatly Reduced Losses . . . Waveguides", Proc. Third European Conf. on Integrated Optics, Springer-Verlag, 1985, pp. 207–208.
Doldissen et al., "Reduction of Bend-Losses . . . Devices", Proc. Third European Conf. on Integrated Optics, Springer-Verlag, Berlin, 1985, pp. 210–214.
"Reduction of Bend Losses . . . Diffusion", Electronics Letters, Jul. 16, 1987, vol. 23, No. 15, pp. 797–798.
Minford et al., "Low-Loss Ti:LiNbO$_3$ . . . um", IEEE Journal of Quantum Electronics, vol. QE-18, No. 10, Oct. 1982, pp. 1802–1806.
"Low-Drive-Voltage . . . Switches", Electronics Letters, Oct. 6th, 1987, vol. 23, No. 21, pp. 1167–1169.
Minakata et al., "Precise Determination of . . . Waveguides", J. Appl. Phys. 49 (9), Sep. 1978, pp. 4677–4682.

Primary Examiner—Brian Healy
Attorney, Agent, or Firm—Sughrue, Mion, Zinn, Macpeak & Seas

[57] ABSTRACT

A polarization-independent optical waveguide switch is provided featuring low loss and a small device element length by making the width of the optical waveguides in the light intake/outlet parts consisting of curved optical waveguides greater than the width of the optical waveguides of the optical coupling part.

3 Claims, 3 Drawing Sheets

POLARIZATION-INDEPENDENT OPTICAL WAVEGUIDE SWITCH

TECHNICAL FIELD

The present invention relates to an optical waveguide switch, and more particularly to a polarization-independent optical waveguide switch which utilizes a crystal substrate displaying an electro-optic effect.

BACKGROUND OF THE INVENTION

An optical waveguide switch is suitable for application in a transmission line changeover device, an external modulator or the like in optical switching equipment, and optical communication networks. The optical waveguide switch (hereinafter simply referred to as "optical switch") employs an optical directional coupler comprising an optical coupling part. The optical coupling part is composed of two optical waveguides disposed adjacent to each other and formed on a crystal substrate displaying an electro-optic effect and light intake/outlet the optical coupling part serving as curved optical waveguides.

Among optical waveguide switches, a polarization-independent optical waveguide switch adaptable for single-mode optical fiber links is particulary desired.

Such an optical waveguide switch is reported in Electronics Letters, Vol. 23, No. 21, pp. 1167-1169 (1987) by M. Kondo et al. In the optical switch, the effective refractive indices of an optical coupling part for two mutually perpendicular polarization components of a light wave propagating through the waveguides are controlled so as to be approximately equal. With such an arrangement, it become possible to carry out a switching operation for a light wave with an arbitrary polarization.

FIG. 1 illustrates structural features of the Kondo et al optical waveguide switch with minor modifications. The optical switch comprises two optical waveguides 2 which form an optical coupling part 2a and light intake/outlet parts 2b, and which are formed by thermally diffusing Ti in to a LiNbO$_3$ substrate 1. Light path changeover or modulation of a light wave is carried out by applying a voltage to control electrodes 4 provided in the optical coupling part 2a. Each of the optical waveguides 2 comprises a coupling waveguide 21 which provides the coupling part 2a together with another coupling waveguide 21 of the other optical waveguide 2, and curved optical waveguides 22 serving as the intake/outlet parts 2b. The effective refractive indices of both the coupling waveguides 21 are made equal for both ordinary and extraordinary rays (or mutually orthogonal propagation components of light). Thus, complete coupling lengths of the coupling waveguides 21 which are defined as a length enough to completely shift light energy in one coupling waveguide to another through optical coupling are equal for both ordinary and extraordinary rays, resulting in a polarization-independent optical waveguide switch.

The effective refractive index of an optical waveguide is known to be determined by the dimensions of the width and the depth of an optical waveguide and the refractive-index difference between the optical waveguide and a substrate. In addition, it is known that the value of the effective refractive index is greater for greater values of these factors. On the other hand, the difference between the refractive index of the optical waveguide and the refractive index of the LiNbO$_3$ substrate generally increases with the increase in the concentration of Ti for each of two polarization components (ordinary ray and extraordinary ray) that are mutually orthogonal while the increasing tendency of the refractive-index difference is different from one polarization component to the other (See for example, J. Appl. Phys. 49(9), September 1978, pp. 4677-4682.) Thus, the same refractive-index differences for mutually orthogonal polarization components are achieved at a specific concentration of Ti (referred to as specific Ti concentration hereinafter) in the waveguide. The specific Ti concentration is defined as a Ti concentration in the coupling waveguides for which the differences between the refractive index of the waveguide and that of the substrate are equal for both ordinary and extraordinary rays. The specific Ti concentration depends on the width of the coupling waveguides and the gap G therebetween.

The specific Ti concentration exists in an area where the Ti concentration is relatively low compared with a Ti concentration attained in polarization-dependent optical switches. For instance, according to the referenced work by M. Kondo et al., it is the quantity of thermally diffused Ti of a Ti film with a thickness of 470 Å under the conditions of 1050° C. and 8 hours. In contrast, for a polarization-dependent optical witch, a Ti film with thickness in the range of 700 to 900 Å is diffused under the same temperature and duration of diffusion so that the diffused Ti quantity in the reference is less by 20-45% than the corresponding value for an ordinary or polarization-dependent optical switch. Thus, in the prior polarization-independent optical switch disclosed in the reference, a light wave is confined less strongly to the waveguides than in the prior art polarization-dependent optical switch because the difference between the refractive indices of the Ti-diffused region and the LiNbO$_3$ substrate is smaller in the former than in the latter.

As a general characteristic of the light wave, radiation loss for curved waveguides is less when its confinement to the curved waveguides is stronger. In other words, by increasing the effective refractive index of the optical waveguides 2, the curvature of the curved portions, namely, the curved light intake/outlet parts 2b of the optical waveguides 2, can be increased. As a result it becomes possible to decrease the device lengths for the optical witch and modulator. For the prior art polarization-independent optical switch shown in FIG. 1, a specific Ti concentration with a small amount of diffused Ti has to be used. Hence, the curvature of the curved light intake part 2b of the optical waveguides cannot be made large in view of the radiation loss. Because of this limitation on the diffused amount of Ti, it is not possible to reduce the device length beyond a certain value. More definitely, it is difficult to realize small device elements while maintaining a loss of less than 1 dB/cm for a light intake part with a radius of curvature of, for example, 40 mm.

SUMMARY OF THE INVENTION

It is, therefore, an object of the present invention to provide a polarization-independent optical switch which permits a reduction in the length of the device elements while maintaining a low loss.

According to the present invention, an optical waveguide switch comprises two optical waveguides formed in a crystal substrate displaying an electro-optic effect.

The optical waveguides are disposed close to each other, and two electrodes are provided, respectively, in each of the optical waveguides. The optical switch further comprises a directional coupler for switching optical coupling between the optical waveguides in response to a voltage applied to the electrodes, and an optical guiding part having optical waveguides connected to the optical waveguides of the directional coupler for inputting/outputting light to the directional coupler. The width of the optical waveguides of the light guiding part is greater at least in part than the width of the optical waveguides of the optical directional coupler. The optical waveguides have a specific concentration of Ti which is thermally diffused into the substrate. The optical guides present the same differences between the refractive indices of the Ti diffused waveguide and the substrate for both ordinary and extraordinary rays.

In accordance with more specific features of the present invention, the optical waveguides of the optical coupler having coupling waveguides for providing a complete coupling length therebetween, and the optical waveguides of the guiding parts or light intake/outlet parts have curved waveguides formed to provide light intake/outlet parts. Both the coupling waveguides are formed with the specific Ti concentration. The width of the coupling waveguides is chosen to be smaller than the width of the curved waveguides. Thus, the effective refractive index for the curved optical waveguide corresponding to the light intake/outlet part will be greater than that for the coupling optical waveguide corresponding to the coupling part.

Therefore, the confinement of the light wave will be stronger in the optical waveguides of the light intake/outlet parts than in the optical waveguides of the optical coupling part. As a result, the radiation loss suffered by the light wave due to the light intake/outlet parts will be reduced as compared with the situation in which the widths of the optical waveguides for the optical coupling part and the light intake/outlet parts are set to the same value $W_1$. Further, since low-loss intake/outlet parts can be obtained even when the curved portions of the optical waveguides are given sharper bending, it is possible to reduce the length of the device element of the optical switch. Accordingly, it is possible to realize a small-sized matrix optical switch in which a large number of such optical switches are integrated on a single substrate. In other words, if the length of the light intake/outlet parts can be decreased for a reduction in the loss, then the number of optical switches than can be integrated on a single substrate can be increased correspondingly, and an expansion of the matrix size can be accomplished.

DETAILED DESCRIPTION OF THE INVENTION

Figure 1:
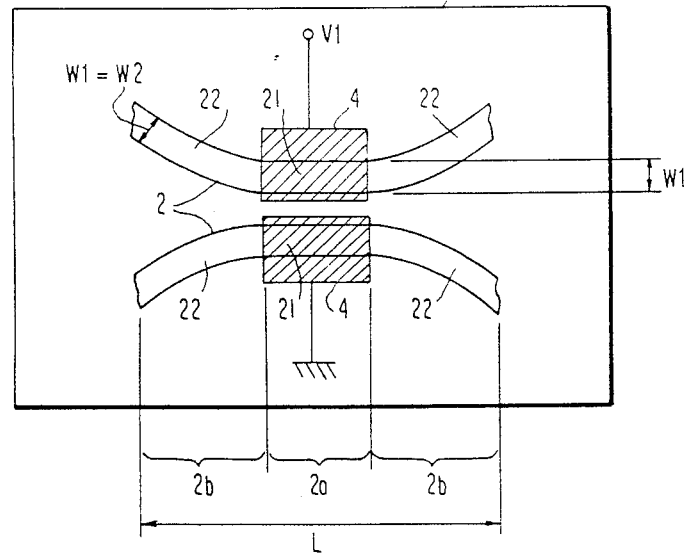
FIG. 1 is a schematic plan view for illustrating the prior art optical switch.

Referring to the drawings, the present invention is described below.

Figure 2:
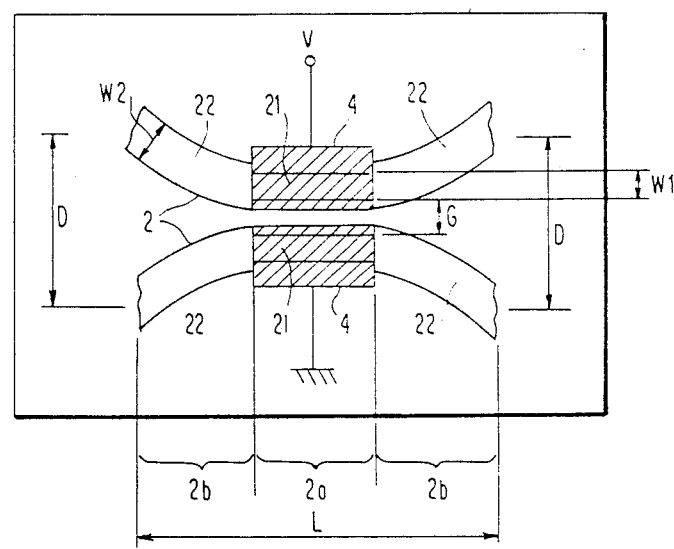
FIG. 2 is a plan view for schematically showing a first embodiment of the present invention.

In FIG. 2, an optical waveguide switch of a first embodiment comprises two optical waveguides 2. Each waveguide 2 consists of a coupling optical waveguide 21 for a directional coupling part 2a which extends along the x-axis or y-axis of a z-cut $LiNbO_3$ substrate 1, where the z-axis is in the direction perpendicular to the surface of the paper. In addition, each waveguide 2 consists of curved waveguides 22 for light intake/outlet parts that are connected to the coupling optical waveguides 21. First, Ti is attached to the surface of the substrate 1 to form a film thickness of 470 Å. Then with the application of a photoresist the Ti is removed by photolithography except for the portions of the Ti film above the areas where the waveguides 21 and 22 are to be formed. Next, by heating the substrate in an atmosphere at 1050° C. for 8 hours, the Ti is diffused into the substrate to form waveguides 21 and 22. In the present embodiment, a mask is used which made a width of 9 $\mu$m for the waveguides 21 and a width of 11 $\mu$m for the waveguides 22. The spacing between the two waveguides 21 and the length of the waveguides 21 is selected to be 8 $\mu$m and 14 mm, respectively. On the waveguides 21 two control electrodes 4 are formed by a sputtering method. The radius of curvature of the waveguides 22 is 40 mm.

With one of the electrodes of a directional coupler type optical switch thus formed kept grounded, if the other electrode is grounded, then the two waveguides 21 are completely connected so that light in one of the waveguides 21 can be completely shifted to the other waveguide 21. If the other electrode is connected to a prescribed voltage $V_0$, the two waveguides 21 are decoupled and light propagating in each waveguide proceeds to the curved waveguide 22 connected to each waveguide 21. The prescribed voltage $V_0$ is a voltage which is sufficiently large to decouple the light of the TE mode of the waveguide. The coupling and decoupling as a result of removal and application of the voltage are caused by an electro-optic effect of the crystals and are based on the changes in the refractive index of the crystals due to electric field. The loss in the light intake/outlet part 2b turned out to be 0.9 dB/cm which is lower than a loss of 2 dB/cm attained in a structure having the same width $W_1$ over the optical waveguides 21 and 22.

Figure 3:
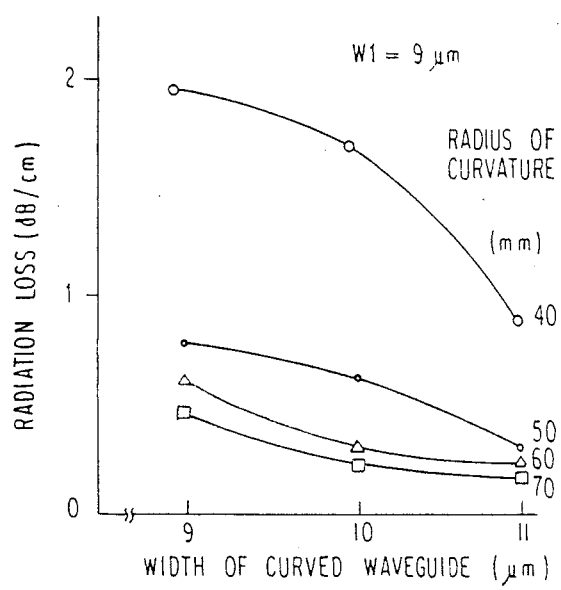
FIGS. 3 and 4 are charts plotting the relation between the width of the curved waveguide and the radiation loss.

FIG. 3 shows plots of radiation loss against the width $W_2$ of the curved waveguides 22 for the case in which the dimension of the optical coupling part is identical to the case of the first embodiment ($W_1 = 9$ $\mu$m), with the radius of curvature of the light intake/outlet part as the parameter. From the figure, it is clear that the radiation loss can be reduced by increasing the width of the optical waveguides.

Figure 4:
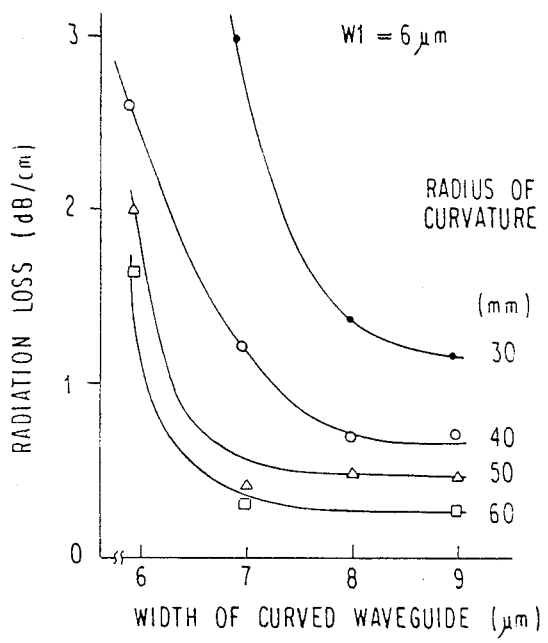

FIG. 4 shows plots of the radiation loss of the optical waveguides 22, with the radius of curvature of the waveguides 22 as the parameter, for the case where the value $W_1$ of the optical waveguides 21 is 6 $\mu$m and the gap G between the waveguides 21 is 8 $\mu$m. In this case, the diffusion conditions to realize the specific Ti concentration were Ti film thickness of 630 Å and an atmosphere of wet air at 1050° C. for 8 hours. As is clear from the figure, in contrast, for example, to the loss of 2.6 dB/cm for the radius of curvature of 40 mm and the width $W_2$ of the curved waveguides having the same value of 6 μm as the width $W_1$ of the coupling part, a loss of 0.8 dB/cm can be realized by taking $W_2$ to be 9 μm.

This value of the radiation loss is comparable to the loss of 0.6–0.8 dB/cm for a polarization-dependent element having identical dimensions as above and formed by diffusing, under the same conditions as in the above, a Ti film with thickness of about 850 Å corresponding to the Ti diffusion quantity required for the case of an optical waveguide satisfying the single mode condition and the strongest confinement of the light wave mode. Therefore, it can be confirmed that the radiation loss is reduced to a minimum achievable level by means of the present invention.

As shown in the above, the present invention makes it possible to realize a reduction in the length L of the device element for a polarization-independent optical switch and modulator. For example, by using the characteristic shown in FIG. 4 with the separation D between the two light intake/outlet parts $2b$ of 200 μm, with a change in the width of the curved optical waveguides 22 from 6 μm of the conventional structure shown in FIG. 1 to 9 μm of the present invention, a reduction of 7 mm in the device element length can be realized with approximately the same loss even when the radius of curvature is decreased from about 60 mm to about 40 mm.

Figure 5:
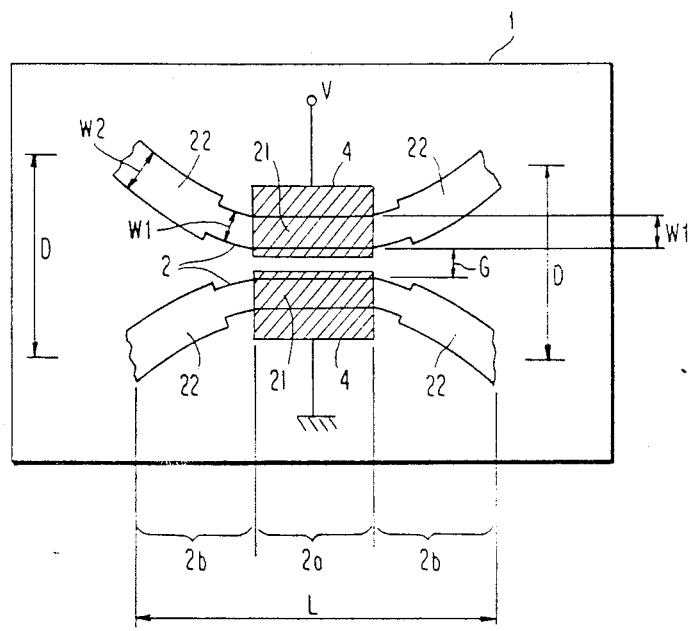
FIG. 5 is a schematic plan view of a second embodiment of the present invention.

FIG. 5 is a plan view for schematically illustrating an optical switch in accordance with a second embodiment of the present invention. In this embodiment, the width of the optical waveguides 22 of the light intake/outlet parts $2b$ is given a larger value than the width of optical waveguides 21 in the optical coupling part $2a$ only in a portion, so that the optical waveguides 22 consist of parts with width $W_2$ and other parts with width $W_1$. With such a construction, it is possible to set the complete coupling length of the optical coupling part $2a$ for an arbitrary polarization component to be entirely free from any influence from the optical waveguides 22 of the light intake/outlet part $2b$. Moreover, it is possible to obtain a polarization-independent optical switch which has low loss and a small device length L.

It should be mentioned in the structure of the present invention that the loss generated due to light wave mode coupling, light wave mode conversion, and the like at the connection parts of two optical waveguides with different widths $W_1$ and $W_2$ has been confirmed by experiment to be extremely small, being less than 0.1 dB/cm.

Further, the optical switch with the structure of the present invention can be operated as an optical modulator by applying a modulation signal to the control electrodes, as is well known.

As described in the foregoing, according to the present invention it is possible to obtain a polarization-independent optical switch with low loss and a small device element length by making the width of the optical waveguides of the light intake/outlet parts consisting of curved optical waveguides greater than the width of the optical waveguides of the optical coupling part.

Although the above embodiments are described with a $LiNbO_3$ crystal substrate, use can be made of other materials such as $LiTaO_3$ and compound semiconductor materials.

What is claimed is:

1. An optical switch comprising:
   first and second optical waveguides formed in a crystal substrate displaying an electro-optical effect, said first and second optical waveguides being closely disposed to each other, each of said first and second optical waveguides comprising a coupling optical waveguide connected between two curved optical waveguides;
   at least two electrodes provided respectively in each of said first and second optical waveguides;
   a directional coupler comprising said coupling optical waveguides for switching optical coupling between said first and second optical waveguides in response to a voltage applied to said electrodes; and,
   an optical guiding part comprising said curved optical waveguides for inputting/outputting light to said directional coupler,
   whereby the width of said curved optical waveguides of said optical guiding part is greater at least in part than the width of said coupling optical waveguides of said directional coupling part; and
   wherein the effective refractive indices of each of said coupling optical waveguides of said first and second optical waveguides are optical for both ordinary and extraordinary light rays.

2. An optical switch as claimed in claim 1, wherein said crystal substrate is $LiNbO_3$.

3. An optical switch as claimed in claim 1, wherein said coupling optical waveguides have a uniform width along a straight line in said directional coupler.

* * * * *

UNITED STATES PATENT AND TRADEMARK OFFICE
CERTIFICATE OF CORRECTION

PATENT NO. : 4,983,006
DATED : January 8, 1991
INVENTOR(S) : Hiroshi Nishimoto

It is certified that error appears in the above-identified patent and that said Letters Patent is hereby corrected as shown below:

Column 6, line 43, delete "optical" (2nd Occur.) and insert --equal--.

Signed and Sealed this

Seventh Day of July, 1992

*Attest:*

DOUGLAS B. COMER

*Attesting Officer*   *Acting Commissioner of Patents and Trademarks*